US007743611B2

(12) United States Patent
Horii

(10) Patent No.: US 7,743,611 B2
(45) Date of Patent: Jun. 29, 2010

(54) BACKHOE HYDRAULIC SYSTEM

(75) Inventor: Hiroshi Horii, Sakai (JP)

(73) Assignee: Kubota Corporation, Osaka (JP)

( * ) Notice: Subject to any disclaimer, the term of this patent is extended or adjusted under 35 U.S.C. 154(b) by 243 days.

(21) Appl. No.: 11/864,430

(22) Filed: Sep. 28, 2007

(65) Prior Publication Data

US 2008/0078174 A1 Apr. 3, 2008

(30) Foreign Application Priority Data

Sep. 29, 2006 (JP) ............................ 2006-266592

(51) Int. Cl.
*F16D 31/02* (2006.01)

(52) U.S. Cl. ............................ 60/421; 60/484; 60/486

(58) Field of Classification Search .................. 60/421, 60/422, 484, 486
See application file for complete search history.

(56) References Cited

U.S. PATENT DOCUMENTS

| | | | | |
|---|---|---|---|---|
| 5,832,729 A * | 11/1998 | Reid et al. | .................... | 60/421 |
| 7,069,674 B2 * | 7/2006 | Arii | ............................ | 60/422 |
| 7,571,558 B2 * | 8/2009 | Horii | ............................ | 60/421 |
| 2006/0266029 A1 | 11/2006 | Asakage et al. | | |

FOREIGN PATENT DOCUMENTS

| | | |
|---|---|---|
| EP | 1726724 | 11/2006 |
| JP | 2001050209 | 2/2001 |
| JP | 2003184815 | 7/2003 |
| JP | 2004114762 A * | 4/2004 |
| JP | 2006161510 | 6/2006 |
| JP | 2006200179 | 8/2006 |

* cited by examiner

*Primary Examiner*—Michael Leslie
(74) *Attorney, Agent, or Firm*—The Webb Law Firm

(57) ABSTRACT

The present invention overcomes drawbacks whereby the supply of pressure oil to a hydraulic cylinder for operating a ground working device is temporarily cut, and operation of the ground working device is temporarily stopped when a control valve for the travel device is operated while a control valve for the ground working device is being operated. When control valves (V4, V5) for the travel devices are operated during operation of control valves (V6, V7, V8) for the ground working device, and a first flow channel switching valve (V12) is switched from an operating position (31) to a travel position (34), a second flow channel switching valve (V13) is switched from a non-feeding position (39) to a feeding position (40) before or at the same time as the first flow channel switching valve (V12).

3 Claims, 5 Drawing Sheets

BACKHOE HYDRAULIC SYSTEM

BACKGROUND OF THE INVENTION

1. Field of the Invention

The present invention relates to a backhoe hydraulic system in which a swivel base equipped with a ground working device is mounted so as to be able to swivel on a travel body about a vertically directed central axis.

2. Description of the Related Art

Conventional backhoe hydraulic systems in which a swivel base equipped with a hydraulically driven ground working device is mounted so as to be able to swivel on a travel body provided with a pair of hydraulically driven left and right travel devices about a vertically directed central axis include a system that is configured so that during a non-travel state, pressure oil from a first pump and a second pump is fed together to the ground working device, and the pressure oil from a third pump is fed to a swivel motor for swiveling the swivel base. During a travel state, the pressure oil from the first pump is fed to one of the left and right travel devices, the pressure oil from the second pump is independently fed to the other of the left and right travel devices, and the pressure oil from the third pump is fed to a hydraulic actuator of the ground working device (see JP 2006-161510A, for example).

This hydraulic system is provided with a first flow channel switching valve that is capable of switching between a work position in which pressure oil from the first pump and the second pump is fed together to a control valve for the ground working device, and a travel position in which the pressure oil from the first pump and the second pump is fed independently to a control valve for the left and right travel devices; and a second flow channel switching valve that is capable of switching between a non-feeding position in which the pressure oil from the third pump is not fed to the control valve for the ground working device, and a feeding position in which the pressure oil from the third pump is fed to the control valve for the ground working device.

In the hydraulic system, the second flow channel switching valve and the first flow channel switching valve are composed of pilot-operated switching valves that are switched by a pilot pressure, and are configured so that the pilot pressure is fed to a travel-independent valve and the flow channel switching valves when operation of the control valve for the travel device is detected, and the pilot pressure is fed to the flow channel switching valves when operation of the control valve for the ground working device is detected.

The first flow channel switching valve is also configured so as to by switched from the work position to the travel position by the pilot pressure that is created by the operation of the control valve for the travel device, and the second flow channel switching valve is configured so as to remain in the non-feeding position without being switched to the feeding position by the pilot pressure created by the operation of the control valve for the ground working device during the non-travel state, and to by switched to the feeding position by the pilot pressure that is the sum of the pilot pressure created by the operation of the control valve for the travel device, and the pilot pressure created by the operation of the control valve for the ground working device when the ground working device is in use, and the control valve for the travel device is operated.

SUMMARY OF THE INVENTION

In the aforementioned hydraulic system, in a case in which the control valve for the travel device is operated while the ground working device is in use, when the first flow channel switching valve is switched before the second flow channel switching valve, drawbacks occur in that the supply of pressure oil to the boom cylinder for operating the boom is temporarily cut when a travel operation is performed while the boom is being raised, for example, and boom operation is temporarily stopped.

Therefore, an object of the present invention is to overcome these drawbacks whereby the supply of pressure oil to the hydraulic cylinder for operating the ground working device is temporarily cut, and operation of the ground working device is temporarily stopped when the control valve for the travel device is operated while the control valve for the ground working device is being operated.

The backhoe hydraulic system of the present invention comprises travel pumps for feeding pressure oil to control valves for a travel device; a swivel pump for feeding pressure oil to a control valve for a swivel base; a first flow channel switching valve that is capable of switching between a work position in which the pressure oil from the travel pumps is fed to control valves for a ground working device during non-travel, and a travel position in which the pressure oil from the travel pumps is fed to control valves for a left-right travel device during travel; and a second flow channel switching valve that is capable of switching between a non-feed position in which the pressure oil from the swivel pump is not supplied to the control valves for the ground working device, and a feeding position in which the pressure oil from the swivel pump is fed to the control valves for the ground working device; wherein the second flow channel switching valve switches from the non-feeding position to the feeding position at the same time as the first flow channel switching valve or before the first flow channel switching valve when the control valves for the travel device are operated during operation of the control valves for the ground working device, and the first flow channel switching valve is switched from the work position to the travel position.

According to this configuration, when the control valves for the travel device are operated during operation of the control valves for the ground working device, the second flow channel switching valve is switched before or at the same time as the first flow channel switching valve, whereby the continuity of the movement of the ground working device can be maintained when the control valves for the travel device are operated while the ground working device is in use, and it is possible to prevent problems from occurring in which the pressure oil supply to the boom cylinder for operating the boom is temporarily cut, and boom operation is temporarily stopped when a travel operation is performed while the boom is being raised, for example.

In a preferred configuration, the travel pumps have two pumps that include a first pump and a second pump, and the first flow channel switching valve is configured so as to feed the pressure oil from the first pump in the work position together with the pressure oil from the second pump to the control pumps for the ground working device, and to feed the pressure oil from the first pump in the travel position and the pressure oil from the second pump independently to the control valves for the left-right travel device.

A configuration may also be adopted in which the backhoe hydraulic system comprises a travel detection circuit for feeding a pilot pressure to the first flow channel switching valve to switch the first flow channel switching valve to the travel position when the control valves for the travel device are operated, and a flow channel switching circuit that is capable of feeding a pilot pressure to the second flow channel switching valve so as to switch the second flow channel switching valve to the feeding position when the control valves for the travel device are operated during operation of the control valves for the ground working device, wherein a flow channel switching operation valve is provided to the flow channel switching circuit, and the flow channel switching operation valve is configured so as to be capable of switching between a non-operating position in which the pilot pressure is not fed to the second flow channel switching valve, and an operating position in which the pilot pressure is fed to the second flow channel switching valve, and so as to be switched to the operating position by the pilot pressure from the travel detection circuit.

A configuration may be adopted in which a flow channel switching operation valve disposed in the flow channel switching circuit is provided, and the flow channel switching operation valve is configured so as to be capable of switching between a non-operating position in which the pilot pressure is not fed to the second flow channel switching valve, and an operating position in which the pilot pressure is fed to the second flow channel switching valve, and so as to be switched to the operating position by the pilot pressure from the travel detection circuit.

According to such a configuration, the switching pressure of the flow channel switching operation valve can easily be set so that the flow channel switching operation valve is switched to the operating position by a pilot pressure that is equal to that of the first switching valve, or so that the flow channel switching operation valve is switched to the operating position by a pilot pressure that is lower than that of the first switching valve, and the hydraulic system can easily be configured so that the flow channel switching valves are switched before or at the same time as the travel-independent valve when the control valves for the travel device are operated while the ground working device is in use.

DESCRIPTION OF THE PREFERRED EMBODIMENTS

Embodiments of the present invention will be described hereinafter with reference to the drawings. In FIG. 1, the reference numeral 1 indicates a backhoe, and the backhoe 1 is primarily composed of a travel body 2 and an upper swivel body 3 that is mounted so as to be capable of full rotation about a vertical swivel axis on the travel body 2.

The travel body 2 is provided with crawler travel devices 7 on the left and right sides of a track frame 4 that are configured so that crawler belts 6 are cycled by travel motors 5 composed of hydraulic motors.

A dozer device 8 is provided to the front part of the track frame 4. The blade of the dozer device is raised and lowered by the extension and retraction of a dozer cylinder 9 composed of a hydraulic cylinder.

The swivel body 3 is provided with a swivel base 10 that is mounted on the track frame 4 so as to be able to rotate about the swivel axis; a ground working device (digging device) 11 provided to the front part of the swivel base 10; and a cabin 12 that is mounted on the swivel base 10.

An engine, a radiator, a fuel tank, a hydraulic oil tank, a battery, and other components are provided to the swivel base 10, and the swivel base 10 is swiveled by a swivel motor 13 that is composed of a hydraulic motor.

A swing bracket 15 that is supported so as to be able to swing to the left and right about a vertical axis is provided on a support bracket 14 that is provided so as to protrude forward from the swivel base 10 at the front part of the swivel base 10, and the swing bracket 15 is swung to the left and right by the extension and retraction of a swing cylinder 16 that is composed of a hydraulic cylinder.

The ground working device 11 is primarily composed of a boom 17 that can swing vertically, and whose base part is pivotally connected to the upper part of the swing bracket 15 so as to be able to rotate about a horizontal axis; an arm 18 that can swing forward and backward, and whose base part is pivotally connected to the distal end of the boom 17 so as to be able to rotate about a horizontal axis; and a bucket 19 that can swing forward and backward, and that is pivotally connected to the distal end of the arm 18 so as to be able to rotate about a horizontal axis.

The boom 17 is raised by the extension of a boom cylinder 21 that is provided between the boom 17 and the swing bracket 15, and the boom 17 is lowered by the retraction of the boom cylinder 21.

The arm 18 is swung to the rear in a crowding operation (scooping operation) by the extension of an arm cylinder 22 that is provided between the arm 18 and the boom 17, and the arm 18 is swung forward in a dumping operation by the retraction of the arm cylinder 22.

The bucket 19 is swung to the rear in a crowding operation (dipping operation) by the extension of a bucket cylinder 23 that is provided between the bucket 19 and the arm 18, and the bucket 19 is swung forward in a dumping operation by the retraction of the bucket cylinder 23.

The boom cylinder 21, the arm cylinder 22, and the bucket cylinder 23 are each composed of hydraulic cylinders.

The hydraulic system for operating the various hydraulic actuators provided to the backhoe 1 will next be described with reference to FIGS. 2 through 4.

In FIG. 2, V1 is a swivel control valve for controlling the swivel motor 13, V2 is a dozer control valve for controlling the dozer cylinder 9, V3 is a swing control valve for controlling the swing cylinder 16, V4 is a left travel control valve for controlling the left-side travel motor 5, V5 is a right travel control valve for controlling the right-side travel motor 5, V6 is an arm control valve for controlling the arm cylinder 22, V7 is a bucket control valve for controlling the bucket cylinder 23, V8 is a boom control valve for controlling the boom cylinder 21, and V9 is an SP control valve for controlling a hydraulic breaker and other hydraulic attachments that are separately attached to the ground working device 11.

The control valves V1 through V9 are composed of direct-drive spool switching valves, and are composed of pilot-operated switching valves that are switched by a pilot pressure. The control valves V1 through V9 are moved in proportion to the amount of operation of each operating means for operating the control valves V1 through V9, and are configured so that a quantity of pressure oil that is proportional to the amount of movement of the control valves V1 through V9 is fed to the hydraulic actuator that is to be controlled, and the operating speed of the operated component can be varied in proportion to the amount of operation of each operating means.

The left-side travel control valve V4 is switched by a left-side travel pilot valve PV1 that is operated by a left-side travel lever 24, the right-side travel control valve V5 is switched by a right-side travel pilot valve PV2 that is operated by a right-side travel lever 25, and the travel levers 24, 25 and pilot valves PV1, PV2 are disposed in front of an operator chair inside the cabin 12.

The left and right travel levers 24, 25 are provided so as to be capable of tilting forward and backward in operation. The left and right travel control valves V4, V5 are operated when the left and right travel levers 24, 25 are moved forward, whereby the travel motors 5 are driven so that the corresponding travel devices 7 are driven forward, and the left and right travel control valves V4, V5 are operated when the left and right travel levers 24, 25 are moved backward, whereby the travel motors 5 are driven so that the corresponding travel devices 7 are driven backward.

The swivel control valve V1 and the arm control valve V6 are switched by a steering pilot valve PV3 operated by a single steering lever 26, and the steering lever 26 is disposed on the left side of the operator chair.

The bucket control valve V7 and the boom control valve V8 are also switched by a steering pilot valve PV4 that is operated by a single steering lever 27, and the steering lever 27 is disposed on the right side of the operator chair.

The left and right steering levers 26, 27 are each provided so as to be able to tilt forward, backward, left, and right. In the present embodiment, corresponding control valves V1, V6 operate so that the swivel base 10 swivels to the left or right when the left steering lever 26 is moved left or right, and the arm 18 dumps/crowds when the left steering lever 26 is moved forward or backward. Corresponding control valves V7, V8 operate so that the bucket 19 crowds/dumps when the right steering lever 27 is moved left or right, and the boom 17 is lowered or raised when the right steering lever 27 is moved forward or backward.

The dozer control valve V2, the swing control valve V3, and the SP control valve V9 are operated by pilot valves that are operated by operating means not shown in the drawings.

A first pump P1, a second pump P2, a third pump P3, and a fourth pump P4 are provided as pressure oil feeding sources in the hydraulic system, and the pumps P1, P2, P3, P4 are driven by an engine E that is mounted on the swivel base 10.

The first pump P1 and the second pump P2 are swash plate variable-displacement axial pumps, and are integrally formed by an equal-flow double pump whereby equal discharge quantities are obtained from two discharge pumps. The first pump P1 and the second pump P2 are used primarily by the travel motors 5 as travel pumps, and are also used by the hydraulic cylinder of the ground working device 11.

The third pump P3 and the fourth pump P4 are composed of fixed-displacement gear pumps. The third pump P3 is used primarily by the swivel motor 13 as a swivel pump. The third pump is also used by the dozer cylinder 9 and the swing cylinder 16. The fourth pump P4 is used for feeding a pilot pressure.

The first pump P1 and the second pump P2 may also be formed separately from each other.

In this hydraulic system, a load sensing system is employed that is capable of saving power and enhancing ease of operation through a configuration whereby the discharge quantities of the first and second pumps P1, P2 are controlled according to the work load pressure of the boom 17, the arm 18, the bucket 19, and other components, and the hydraulic power needed for the load is discharged from the first and second pumps P1, P2. The load sensing system employs an after-orifice system in which a pressure compensation valve CV is connected after the primary spools of each of the arm control valve V6, the bucket control valve V7, the boom control valve V8, and the SP control valve V9.

The control system circuit of the load sensing system is not shown in the drawings.

In the drawings, V10 is an unloading valve in the load sensing system, and V11 is a system relief valve in the load sensing system.

The travel, swivel, dozer, and swing sections are composed of open circuits.

In this hydraulic system, the pressure oil from the first pump P1 and the second pump P2 can be fed together to the boom 17, the arm 18, the bucket 19, and the SP control valves V8, V6, V7, V9 during non-travel. During travel, the pressure oil from the first pump P1 and the second pump P2 can be independently fed to the control valves V4, V5 for the left and right travel devices 7, and the pressure oil from the third pump P3 can be fed to the boom 17, the arm 18, the bucket 19, and the SP control valves V8, V6, V7, V9.

The hydraulic circuit structure for performing this operation will be described with reference to FIGS. 2 and 3.

A first flow channel switching valve V12 composed of a direct-drive spool pilot-operated switching valve is connected to the discharge circuits 28, 29 of the first pump P1 and the second pump P2.

The first flow channel switching valve V12 can switch between an operating position 31 for connecting to a work system feeding circuit 30 for merging the discharge circuit 28 of the first pump P1 and the discharge circuit 29 of the second pump P2 and feeding pressure oil to the boom 17, the arm 18, the bucket 19, and the SP control valves V8, V6, V7, V9, and a travel position 34 for connecting the discharge circuit 29 of the first pump P1 to a travel right feeding circuit 32 for feeding pressure oil to the right-side travel control valve V5, and connecting the discharge circuit 29 of the second pump P2 to a travel left feeding circuit 33 for feeding pressure oil to the left-side travel control valve V4. The first flow channel switching valve V12 is switched to the operating position 31 by a spring, and is switched to the travel position 34 by a pilot pressure created by a travel-independent switching circuit 35.

A pressure oil feeding channel 37 for feeding pressure oil to the swivel, dozer, and swing control valves V1, V2, V3 is connected to the discharge circuit 36 of the third pump P3, and the discharge circuit 36 is connected to a second flow channel switching valve V13 via the swivel control valve V1, the dozer control valve V2, and the swing control valve V3 in sequence.

A connection circuit 38 is connected downstream from the swing control valve V3 and upstream from the second flow channel switching valve V13 of the discharge circuit 36 of the third pump P3. The connection circuit 38 is connected to the aforementioned work system feeding circuit 30; the discharge circuit 36 of the third pump P3, and the work system feeding circuit 30 are connected to each other by the connection circuit 38; and a check valve V14 for preventing pressure oil from flowing from the work system feeding circuit 30 to the discharge circuit of the third pump P3 is provided in the connection circuit 38.

The second flow channel switching valve V13 is composed of a direct-drive spool pilot-operated switching valve that can switch between a non-feeding position 39 in which the discharge circuit 36 of the third pump P3 is connected to a drain circuit d, whereby the pressure oil from the third pump P3 is not fed to the work system feeding circuit 30 (boom 17, arm 18, bucket 19, SP control valves V8, V6, V7, V9), and a feeding position 40 in which communication between the drain circuit d and the discharge circuit 36 of the third pump P3 is blocked, whereby the pressure oil from the third pump P3 is fed to the work system feeding circuit 30 via the connection circuit 38. The second flow channel switching valve V13 is switched to the non-feeding position 39 by a spring, and is switched to the feeding position 40 by a pilot pressure created by a flow channel switching circuit 41.

The pressure oil discharged from the fourth pump P4 is divided by first through third discharge circuits 42, 43, 44. The first discharge circuit 42 is connected to an unloading valve V15, the second discharge circuit 43 is connected to a travel 2-speed switching valve V16, and the third discharge circuit 44 is branched into a valve operation detection circuit 45, a first pilot pressure feeding circuit 46, and a second pilot pressure feeding circuit 47.

The unloading valve V15 is composed of an electromagnetic valve that can switch between a feeding position 48 in which the pressure oil from the first discharge circuit 42 is fed to the left and right travel pilot valves PV1, PV2, the left and right steering pilot valves PV3, PV4, a pilot valve (not shown) for operating the dozer control valve V2, a pilot valve (not shown) for operating the swing control valve V3, and a pilot valve (not shown) for operating the SP control valve V9; and a non-feeding position 49 in which the pressure oil from the first discharge circuit 42 is drained, whereby the pressure oil is not fed to the pilot valves. The unloading valve V15 is switched to the non-feeding position 49 by a spring, and is switched to the feeding position 48 by a magnetization signal.

The magnetization/demagnetization signal to the unloading valve V15 is generated by the raising/lowering of a lock lever disposed beside the operator chair. A demagnetization signal is issued to the unloading valve V15 by the raising of the lock lever when the operator exits from the backhoe 1, and the unloading valve V15 is switched to the non-feeding position 49. A magnetization signal is issued by the pressing down of the lock lever after the backhoe 1 is entered, and the unloading valve V15 is switched to the feeding position 48.

The travel 2-speed switching valve V16 will be described.

The valve operation detection circuit 45 is connected to the drain circuit d through the following sequence of components: diaphragm 50, swivel control valve V1, dozer control valve V2, swing control valve V3, left-side travel control valve V4, right-side travel control valve V5, arm control valve V6, bucket control valve V7, boom control valve V8, SP control valve V9. An AI switch 51 composed of a pressure switch is connected between the swivel control valve V1 and the diaphragm 50 of the valve operation detection circuit 45, and when any of the control valves V1 through V9 is operated from a middle position, a portion of the valve operation detection circuit 45 is blocked, pressure occurs in the valve operation detection circuit 45, and the pressure is detected by the AI switch 51.

The rotational speed of the engine E is automatically reduced to idle speed when a pressure is not detected by the AI switch 51, and when a pressure is detected by the AI switch 51, the rotational speed of the engine E is automatically controlled so that the rotational speed of the engine E increases to a prescribed speed.

The first pilot pressure feeding circuit 46 is connected to a valve operation circuit 52 and the travel-independent switching circuit 35, and a diaphragm 53 is provided upstream of the junction point a of the travel-independent switching circuit 35 and the valve operation circuit 52 of the first pilot pressure feeding circuit 46.

A travel detection circuit 54 is connected to the travel-independent switching circuit 35, and the travel detection circuit 54 is connected to the drain circuit d through the following sequence of components: left-side travel control valve V4, right-side travel control valve V5.

The second pilot pressure feeding circuit 47 is connected upstream of the arm control valve V6 and downstream of the right-side travel control valve V5 of the valve operation detection circuit 45. A diaphragm 55, as well as a check valve 56 for preventing the flow of pressure oil towards the diaphragm 55 from the valve operation detection circuit 45, are provided in sequence from the upstream side to the second pilot pressure feeding circuit 47.

The flow channel switching circuit 41 is connected between the check valve 56 and the diaphragm 55 of the second pilot pressure feeding circuit 47, a flow channel switching operation valve V17 composed of a direct-drive spool pilot-operated switching valve is provided in the flow channel switching circuit 41, and the valve operation circuit 52 is connected to the spool end (pilot port) of the flow channel switching operation valve V17.

The flow channel switching operation valve V17 can switch between a non-operating position 58 in which the pressure oil flowing through the flow channel switching circuit 41 is allowed to flow to the drain circuit d, whereby a pilot pressure is not fed to the second flow channel switching valve V13, and an operating position 59 in which the pilot pressure flowing through the flow channel switching circuit 41 is fed to the second flow channel switching valve V13. The flow channel switching operation valve V17 is switched to the non-operating position 58 by a spring, and is switched to the operating position 59 by a pilot pressure created by the valve operation circuit 52.

In the system thus configured, since pressure does not occur in the travel detection circuit 54, the travel-independent switching circuit 35, and the valve operation circuit 52 when the left and right travel control valves V4, V5 are not operated (when the left and right travel control valves V4, V5 are in the middle position), the first flow channel switching valve V12 is placed in the operating position 31, the flow channel switching operation valve V17 is placed in the non-operating position S8, the second flow channel switching valve V13 is placed in the non-feeding position, and the discharged oil from the first pump P1 and the second pump P2 is merged, and the pressure oil can be fed to the arm 18, the bucket 19, the boom 17, and the SP control valves V6, V7, V8, V9.

When the arm 18, bucket 19, boom 17, and SP control valves V6, V7, V8, V9 are moved from the middle position in this state, the valve operation detection circuit 45 is blocked at a point farther downstream than the junction point b between the valve operation detection circuit 45 and the second pilot pressure feeding circuit 47, and pressure oil from the second pilot pressure feeding circuit 47 flows to the flow channel switching circuit 41. However, since the flow channel switching operation valve V17 is in the non-operating position 58, the pressure oil flowing through the flow channel switching circuit 41 flows to the drain circuit d, a pilot pressure is not created in the spool end part of the second flow channel switching valve V13, the second flow channel switching valve V13 remains in the non-feeding position 39, and the pressure oil from the third pump P3 is not fed to the arm 18, the bucket 19, the boom 17, and the SP control valves V6, V7, V8, V9.

When the left and right travel control valves V4, V5 are operated from the middle position, a portion of the travel detection circuit 54 is blocked, pressure occurs in the travel detection circuit 54, the travel-independent switching circuit 35, and the valve operation circuit 52, and the first flow channel switching valve V12 is switched to the travel position 34, and the flow channel switching operation valve V17 is also switched to the operating position 59.

The discharge oil from the first pump P1 is thereby fed to the right-side travel control valve V5, the discharge oil from the second pump P2 is fed to the left-side travel control valve V4, and the discharge oil from the first and second pumps P1, P2 is not fed to the arm 18, the bucket 19, the boom 17, and the SP control valves.

At this time, when the arm 18, the bucket 19, the boom 17, and the SP control valves V6, V7, V8, V9 are not operated, since the pressure oil from the second pilot pressure feeding circuit 47 flows to the drain circuit d through the check valve 56 and the valve operation detection circuit 45 in sequence even when the flow channel switching operation valve V17 is switched to the operating position 59, the second flow channel switching valve V13 is not switched to the feeding position 40 (the second flow channel switching valve V13 remains in the non-feeding position 39). However, when the arm 18, the bucket 19, the boom 17, and the SP control valves V6, V7, V8, V9 are operated, and the valve operation detection circuit 45 is blocked, the flow channel switching operation valve V17 is switched to the operating position 59, and pressure therefore occurs in the flow channel switching circuit 41, the second flow channel switching valve V13 is switched to the feeding position 40 by the pressure, and the pressure oil from the third pump P3 can be fed to the arm 18, the bucket 19, the boom 17, and the SP control valves V6, V7, V8, V9.

In a case in which one or both of the travel control valves V4, V5 are operated while the arm 18, the bucket 19, the boom 17, and the SP control valves V6, V7, V8, V9 are in operation, e.g., the boom control valve V8 is in a raising operation, the first flow channel switching valve V12 is switched to the travel position 34, and the flow channel switching operation valve V17 is switched to the operating position 59 in a state in which the pressure oil from the second pilot pressure feeding circuit 47 is flowing to the flow channel switching circuit 41. Since the flow channel switching operation valve V17 is switched to the operating position 59, the second flow channel switching valve V13 is switched to the feeding position 40. The flow of pressure oil from the first and second pumps P1, P2 to the boom control valve V8 is thereby stopped, but the pressure oil from the third pump P3 is fed to the boom control valve V8, and the boom 17 therefore continues to operate.

At this time, when the first flow channel switching valve V12 is switched earlier than the flow channel switching operation valve V17, the supply of pressure oil to the boom control valve V8 is temporarily interrupted, and the movement of the boom 17 is temporarily stopped. Therefore, in the present embodiment, the switching pressure of the first flow channel switching valve V12 and the flow channel switching operation valve V17 is set so that the flow channel switching operation valve V17 is switched to the operating position 59 by the same pilot pressure as the first flow channel switching valve V12, or so that the flow channel switching operation valve V17 is switched to the operating position operating position 59 by a lower pilot pressure than the first flow channel switching valve V12.

The continuity of the raising action of the boom 17 is thereby maintained without a temporary interruption of the action of the boom 17 when the travel control valves V4, V5 are operated while the boom control valve V8 is in the raising operation.

The same effects apply to the case in which the travel control valves V4, V5 are operated while the boom control valve V8 is in a lowering operation, or the arm 18, the bucket 19, and the SP control valves V6, V7, V9 are in operation.

In the conventional hydraulic system, when the switching pressure of the second flow channel switching valve is set too low in a case in which the pressure for switching between the first flow channel switching valve and the second flow channel switching valve is adjusted so that the first flow channel switching valve is switched before or at the same time as the second flow channel switching valve when the travel device is operated during operation of the ground working device, there is a possibility of problems occurring whereby the second flow channel switching valve is switched to the feeding position in spite of the fact that the control valves for the travel device are not in operation due to various factors, and the switching pressure of the second flow channel switching valve cannot be significantly reduced when the ground working device is in operation. Problems also occur in responsiveness when the switching pressure of the second flow channel switching valve is increased beyond the necessary level. In the conventional hydraulic system, it is difficult to reliably set the first flow channel switching valve so as to be switched before or at the same time as the second flow channel switching valve, and problems whereby the second flow channel switching valve switches before the first flow channel switching valve occur when the control valves for the travel device are operated while the ground working device is in use.

However, in the hydraulic system configured as described above, the switching pressure of the flow channel switching operation valve V17 can easily be set so that the flow channel switching operation valve V17 is switched to the operating position 59 by the same pilot pressure as that of the first flow channel switching valve V12, or so that the flow channel switching operation valve V17 is switched to the operating position 59 by a lower pilot pressure than the first flow channel switching valve V12, and the hydraulic system can easily be configured so that the second flow channel switching valve V13 is switched before or at the same time as the first flow channel switching valve V12 when the travel control valves V4, V5 are operated while the ground working device 11 is in use.

In this hydraulic system, the left and right travel motors 5 are composed of swash plate variable displacement axial motors that have high and low variable speeds. For example, an automatic travel deceleration system is provided for increasing the motor displacement to increase power during steering, when an obstacle is traveled over, or at other times at which the drive power is insufficient, and a prescribed load or greater load occurs in the travel motors 5, and to automatically reduce the speed of the travel motors 5 from a two-speed state to a one-speed state (low-speed state, high-displacement state) during forward travel in a two-speed state (high-speed state, low-displacement state) of the travel motors 5.

The automatic travel deceleration system will be described with reference to FIGS. 2 and 4.

The left and right travel motors 5 are rotationally driven forward and backward by a process in which pressure oil is fed to one of a pair of motor driving circuits 61 via a counterbalance valve V18 and one of a pair of pressure oil feeding circuits 60 from the travel control valves V4, V5, and oil is discharged via the other motor driving circuit 61, the counterbalance valve V18, and the other pressure oil feeding circuit 60 as the travel levers 24, 25 are moved one of forward and backward; and pressure oil is fed to the other of the pair of motor driving circuits 61 via the counterbalance valve V18 and the other of the pair of pressure oil feeding circuits 60 from the travel control valves V4, V5, and oil is discharged via one of the motor driving circuits 61, the counterbalance valve V18, and one of the pressure oil feeding circuits 60 as the travel levers 24, 25 are moved the other of forward and backward.

The travel motors 5 are switched between the one-speed state and the two-speed state by varying the angle of the swash plate through the use of a swash plate switching cylinder (swash plate switching actuator) 62. In the drawing, the travel motors 5 are placed in the one-speed state when the swash plate switching cylinder 62 is not operated, and the travel motors 5 are switched to the two-speed state by the operation (rod extension) of the swash plate switching cylinder 62.

The swash plate switching cylinder 62 is connected to a cylinder control valve (actuator control valve) V19 via a cylinder operation circuit 63, an operation pressure feeding circuit 64 for selectively transmitting pressure oil to the cylinder control valve V19 from the high-pressure side of the pair of motor driving circuits 61 through the use of a shuttle valve V20 is connected to the cylinder control valve V19, and the swash plate switching cylinder 62 is operated by the pressure oil from the operation pressure feeding circuit 64.

The cylinder control valve V19 is composed of a direct-drive spool pilot-operated switching valve, and can switch between a two-speed position 66 in which the pressure oil from the operation pressure feeding circuit 64 is fed to the swash plate switching cylinder 62 via the cylinder operation circuit 63 to place the travel motors 5 in the two-speed state, and a one-speed position 67 in which the cylinder operation circuit 63 is communicated with the drain circuit d, whereby the operating pressure is not fed to the swash plate switching cylinder 62, and the travel motors 5 are thereby placed in the one-speed state. The cylinder control valve V19 is switched to the two-speed position 66 by the pilot pressure, and is switched to the one-speed position 67 by a spring.

The pilot port of the cylinder control valve V19 is connected to an output port c of the travel 2-speed switching valve V16 via a pilot circuit 68.

The pilot circuit 68 is branched in the interval from the travel 2-speed switching valve V16 to the cylinder control valves V19 and connected to the pilot ports of the cylinder control valves V19 of the left and right travel motors 5, and is configured so that the pilot pressure is transmitted to the left and right cylinder control valves V19 simultaneously.

The travel 2-speed switching valve V16 is composed of a direct-drive spool electromagnetic valve (electromagnetic switching valve).

The second discharge circuit 43 of the fourth pump P4 is connected to the input port f of the travel 2-speed switching valve V16, and is switched to a one-speed position 69 in which the pilot circuit 68 is communicated to the drain circuit d by a spring when a solenoid is demagnetized, and to a two-speed position 70 in which the discharge oil of the fourth pump P4 is transmitted to the pilot circuit 68 by the magnetization of the solenoid.

When the travel 2-speed switching valve V16 is switched to the one-speed position 69, the cylinder control valves V19 of the left and right travel motors 5 are placed in the one-speed position 67, and the left and right travel motors 5 are in the one-speed state. When the travel 2-speed switching valve V16 is switched to the two-speed position 70, the cylinder control valves V19 of the left and right travel motors 5 are switched to the two-speed position 66, and the swash plate switching cylinder 62 operates to simultaneously switch the left and right travel motors 5 to the two-speed position.

The travel 2-speed switching valve V16 is operated by a pushbutton, a pedal, a lever, or another travel two-speed operation means 71, and is configured so that the operating signal from the travel two-speed operation means 71 is inputted to a control device 72, and a two-speed switching command signal (magnetization signal) or a one-speed switching command signal (demagnetization signal) is transmitted to the travel 2-speed switching valve V16 from the control device 72.

First and second detection means 74, 75 composed of pressure sensors for detecting circuit pressure are connected to the discharge circuit 28 of the first pump P1 and the discharge circuit 29 of the second pump P2, respectively, and the detection signals from the detection means 74, 75 are inputted to the control device 72.

A configuration is adopted in which the detection signal of a third detection means 75 for detecting the operation of the travel levers 24, 25 is inputted to the control device 72.

The third detection means 75 is composed of a pressure sensor, is connected via a connection circuit 77 to a command circuit 76 for transmitting a pilot pressure from the travel pilot valves PV1, PV2 to the travel control valves V4, V5 when the travel levers 24, 25 are operated, and detects the forward or backward operation of any of the left and right travel levers 24, 25 (detects the switching of the first flow channel switching valve V12 to the travel position 34).

In the configuration described above, when the operation of the travel control valves V4, V5 is detected by the third detection means 75, and the load on the travel motors 5 increases so that the first detection means 73 and/or the second detection means 74 detect a pressure that is equal to or greater than a prescribed pressure, a deceleration signal (demagnetization signal) is transmitted from the control device 72, and the travel 2-speed switching valve V16 is switched from the two-speed position 70 to the one-speed position 69.

Specifically, even when the travel two-speed operation means 71 is operated, the two-speed switching command signal is transmitted from the control device 72 (the travel 2-speed switching valve V16 is magnetized), and the travel motors 5 are traveling in the two-speed state, the travel motors 5 are configured so as to be automatically switched to the one-speed state by the deceleration signal from the control device 72 when a load that is equal to or greater than a prescribed load acts on the travel motors 5. The motor displacement can thereby be automatically increased to increase the drive power of the travel motors 5 when the load acting on the travel motors 5 increases to a prescribed value or greater.

When the pressure of the discharge circuits 28, 29 of the first and second pumps P1, P2 decreases below a prescribed pressure, a return signal (magnetization signal) is transmitted to switch the travel 2-speed switching valve V16 to the two-speed position 70. However, in this case, the return signal is transmitted when the first detection means 73 and the second detection means 74 both detect that the pressure of the discharge circuits 28, 29 of the first and second pumps P1, P2 is less than the prescribed pressure.

The return signal is transmitted with a time lag when the pressure of the discharge circuits 28, 29 of the first and second pumps P1, P2 decreases below a prescribed pressure, and the travel motors 5 are returned to the two-speed state.

Specifically, in a case in which a load that is equal to or greater than a prescribed load acts on the travel motors 5 while the travel motors 5 are being switched to the two-speed travel state by the travel two-speed operation means 71, and the travel motors 5 are automatically decelerated to the one-speed state, the response time is shortened from detection of a pressure equal to or greater than the prescribed pressure by the first and second detection means 73, 74 to the transmission of the deceleration signal to the travel 2-speed switching valve V16, and the response time is lengthened for transmission of the return signal to the travel 2-speed switching valve V16 to return the travel motors 5 from the one-speed state to the two-speed state when the pressure of the discharge circuits 28, 29 of the first and second pumps P1, P2 decreases below the prescribed pressure, so that the return of the travel 2-speed switching valve V16 to the two-speed position 70 is delayed (a two-speed return delay time is provided). A system can thereby be constructed in which there is no immediate return to the low-displacement state even when the load pressure of the motor driving circuit 61 decreases in conjunction with the switching of the travel motors 5 to the high-displacement state, the high-displacement state of the travel motors 5 can be maintained, and the system is stabilized with respect to hunting that accompanies the displacement change of the travel motors 5.

A system that is stabilized with respect to hunting that accompanies the displacement change of the travel motors 5 may also be constructed by setting the detection pressures of the first and second detection means 73, 74 so that X>Y (specifically, setting a high detection pressure for the case in which the travel motors 5 are automatically decelerated, and setting a low detection pressure for the case in which the travel motors 5 are returned to the two-speed state), wherein X is the detection pressure of the first and second detection means 73, 74 when the deceleration signal is transmitted to the travel 2-speed switching valve V16 after a pressure equal to or greater than the prescribed pressure is detected by the first and second detection means 73, 74, and the travel motors 5 are automatically decelerated from the two-speed state to the one-speed state, and Y is the detection pressure of the first and second detection means 73, 74 when the pressure of the discharge circuits 28, 29 of the first and second pumps P1, P2 decreases below the prescribed pressure, the return signal is transmitted, and the travel motors 5 are returned from the one-speed state to the two-speed state.

Control in which a two-speed return delay time is provided may also be used jointly with control in which the detection pressure when the travel motors 5 are returned to the two-speed state is set lower than the detection pressure when the travel motors 5 are automatically decelerated.

The setting of the detection pressure of the first and second detection means 73, 74, and the two-speed return delay time are preferably variable.

In the automatic travel deceleration system of the present embodiment, the operations for automatically decelerating the travel motors 5 from the two-speed state to the one-speed state when a load that is equal to or greater than a prescribed value acts on the travel motors 5 while the travel motors 5 are traveling in the two-speed state are never affected by the oil temperature of the pressure oil, as in the past.

In the conventional automatic travel deceleration system, a step must be machined into the spools of the cylinder control valves, and an input part must be formed for inputting a load detection signal from the high-pressure side of the motor drive circuit, and drawbacks occurred in that the cylinder control valves were made more complex. However, the cylinder control valves V19 can be simplified in the system of the present embodiment.

The left and right travel motors 5 can also be automatically decelerated at the same time when a load acts on the travel motors 5, and the movement of the actual vehicle can be stabilized.

In the present embodiment, the first and second detection means 73, 74 are connected upstream of the first flow channel switching valve V12, but may also be provided downstream of the first flow channel switching valve V12. The third detection means 75 is unnecessary in this case.

The third detection means 75 may also detect the movement of the travel levers 24, 25 themselves through the use of a limit switch or the like.

In this hydraulic system, the swivel motor 13 is composed of a swash plate variable displacement axial motor that is capable of changing between a high speed and a low speed. When work is performed in which dirt scooped by the bucket 19 is loaded onto the bed of a truck, for example, the swivel base 10 is swiveled while the boom 17 is raised, but the swivel speed of the swivel base 10 is set with emphasis on maneuverability during swiveling when no work is being performed. Therefore, in order to overcome the problem of the swivel base 10 swiveling too rapidly with respect to the raising of the boom 17 so that the swivel base 10 swivels to the desired position before the boom 17 has risen to the desired position (the swivel operation and the raising of the boom 17 do not match), an automatic swivel deceleration system is provided for automatically decelerating the swivel motor 13 from the high-speed state to the low-speed state when the boom 17 or the arm 18 is swung.

The automatic swivel deceleration system will be described with reference to FIGS. 2 and 5.

The swivel motor 13 is rotationally driven forward and backward by a process in which pressure oil is fed from the swivel control valve V1 to one of a pair of motor driving circuits 81, and oil is discharged via the other motor driving circuit 81 as the left steering lever 26 is moved one of left and right; and pressure oil is fed from the swivel control valve V1 to the other of the pair of motor driving circuits 81, and oil is discharged via one of the motor driving circuits 81, as the left steering lever 26 is moved the other of left and right.

The swivel motor 13 is switched between the high-speed state (low-displacement state) and the low-speed state (high-displacement state) by varying the angle of the swash plate through the use of a swash plate switching cylinder (swash plate switching actuator) 82. In the drawing, the swivel motor 13 is placed in the high-speed state when the swash plate switching cylinder 82 is not operated, and the swivel motor 13 is switched to the low-speed state by the operation (rod extension) of the swash plate switching cylinder 82.

The swash plate switching cylinder 82 is connected to the output port g of a cylinder control valve (actuator control valve) V21 via a cylinder operation circuit 84, the input port h of the cylinder control valve V21 is connected to the pair of motor driving circuits 81 via an operation pressure feeding circuit 85, and the drain circuit d is connected to the drain port i of the cylinder control valve V21.

The operation pressure feeding circuit 85 is composed of a first oil channel 85*a* in which one end thereof is connected to the input port h of the cylinder control valve V21; a shuttle valve 85*b* whose output side is connected to the other end of the first oil channel 85*a*; a second oil channel 85*c* for communicating one input side of the shuttle valve 85*b* to one of the motor driving circuits 81; and a third oil channel 85*d* for communicating the other input side of the shuttle valve 85*b* with the other motor driving circuit 81. The pressure oil on the high-pressure side of the pair of motor driving circuits 81 is transmitted to the cylinder control valve V21 as the operating pressure of the swash plate switching cylinder 82.

The cylinder control valve V21 is composed of a direct-drive spool pilot-operated switching valve, and the cylinder operation circuit 84 can switch between a high-speed position 86 in which the swivel motor 13 is placed in the high-speed state by communicating with the drain circuit d, and a low-speed position 87 in which the swivel motor 13 is placed in the low-speed state by transmitting the pressure oil from the operation pressure feeding circuit 85 to the cylinder operation circuit 84 to operate the swash plate switching cylinder 82.

A spring 88 is provided to one end of the spool of the cylinder control valve V21, and the pilot port j of one end of the spool is communicated with the input port h via a detection pressure circuit 89.

One end of a command circuit 90 is connected to the pilot port k of the other end of the spool of the cylinder control valve V21, and the other end of the command circuit 90 is connected to the output port m of a swivel deceleration valve V22.

The swivel deceleration valve V22 is composed of a direct-drive spool pilot-operated switching valve, and the pressure oil from the fourth pump P4 is inputted via the unloading valve V15 to the input port n of the swivel deceleration valve V22.

The swivel deceleration valve V22 can switch between a feeding position 91 in which the pressure oil inputted to the input port n is fed as a command pressure (pilot pressure) to the cylinder control valve V21 via the command circuit 90, and a non-feeding position 92 in which the command circuit 90 is communicated with the drain circuit d, and the command pressure is not fed to the cylinder control valve V21. The swivel deceleration valve V22 is switched to the feeding position 91 by a spring 93, and is switched to the non-feeding position 92 by a pilot pressure inputted to the pilot port s.

A pilot circuit 95 is branched from an arm crowding command circuit 94 for transmitting a pilot pressure to the crowding operation side of the arm control valve V6 from the steering pilot valve PV3 that is operated by the left steering lever 26, a pilot circuit 97 is branched from a boom raising command circuit 96 for transmitting a pilot pressure to the raising operation side of the boom control valve V8 from the control pilot valve PV4 that is operated by the right steering lever 27, and the pilot circuits 95, 97 are connected to the pilot port s of the swivel deceleration valve V22.

In this configuration, when the steering levers 26, 27 are not being operated for boom raising or arm crowding, the swivel deceleration valve V22 is switched to the feeding position 91 by the spring 93, and the pressure oil from the fourth pump P4 is fed to the pilot port k of the other side of the cylinder control valve V21 via the command circuit 90. The cylinder control valve V21 is therefore switched to the high-speed position 86, the cylinder operation circuit 84 is communicated with the drain circuit d, and the swivel motor 13 is in the high-speed state.

Therefore, the swivel motor 13 is normally used in the high-speed state.

When the load of the swivel motor 13 increases, and the pressure of the motor driving circuits 81 increases to or beyond a prescribed pressure during swiveling of the swivel base 10, the cylinder control valve V21 is switched to the low-speed position 87 by the pressure of the detection pressure circuit 89, the swash plate switching cylinder 82 is operated, and the swivel motor 13 is automatically switched from the high-speed state to the low-speed state.

The volume of the third pump P3 is thereby prevented from increasing more than is necessary, and the volume of the third pump P3 can be reduced.

When the steering levers 26, 27 are operated for boom raising or arm crowding, the swivel deceleration valve V22 is switched to the non-feeding position 92 by the pilot pressure from the pilot circuits 94, 97, and the pressure oil from the fourth pump P4 is drained without being fed to the command circuit 90.

When the pressure from the fourth pump P4 is not fed to the pilot port k on the other side of the spool of the cylinder control valve V21, the cylinder control valve V21 is switched to the low-speed position 87 by the spring 88 and the pressure of the detection pressure circuit 89, the swash plate switching cylinder 82 is operated, and the swivel motor 13 is automatically switched from the high-speed state to the low-speed state.

Consequently, in such a case as a simultaneous operation of the boom 17 and the swivel base 10 in which the swivel base 10 is swiveled while the boom 17 is being raised, for example, the swivel motor 13 is automatically decelerated, and the raising of the boom 17 (the speed of the boom 17) is matched with the swiveling of the swivel base 10 (the speed of the swivel base 10).

When the boom 17 or the arm 18 is not operated, the swivel base 10 swivels in the high-speed state of the swivel motor 13, and maneuverability is satisfactory.

There is also no inconvenience of having to adjust the amount of tilt of the steering levers 26, 27 in order to match the raising of the boom 17 with the swiveling of the swivel base 10.

In the present embodiment, the swivel motor 13 is automatically decelerated during raising of the boom 17 or crowding by the arm 18, but this configuration is not limiting, and a configuration may be adopted in which the swivel motor 13 is automatically decelerated during lowering of the boom 17 or dumping by the arm 18.

The cylinder control valve V21 and the swivel deceleration valve V22 may be composed of electromagnetic valves, and the swivel deceleration valve V22 is unnecessary when the cylinder control valve V21 is composed of an electromagnetic valve.

Other Embodiments

In the embodiment described above, an example was described in which the system had two pumps including the first pump (P1) and the second pump (P2) as travel pumps, the first flow channel switching valve (V12) merged the pressure oil from the first pump (P1) and the pressure oil from the second pump (P2) and fed the pressure oil to the control valves (V6, V7, V8) for the ground working device in the operating position (31), and fed the pressure oil from the first pump (P1) and the pressure oil from the second pump (P2) independently to the control valves (V4, V5) for the left and right travel devices in the travel position (34).

However, a configuration other than the one described above may be adopted, in which there is a single travel pump, for example. When there is a single travel pump, the first flow channel switching valve (V12) is configured so as to be able to switch between the operating position (31) in which the pressure oil from the travel pump is fed to the control valves (V6, V7, V8) for the ground working device during a non-travel state, and the travel position (34) in which the pressure oil from the travel pump is fed to the control valves (V4, V5) for the left and right travel devices during a travel state.

KEY TO SYMBOLS

Figure 1:
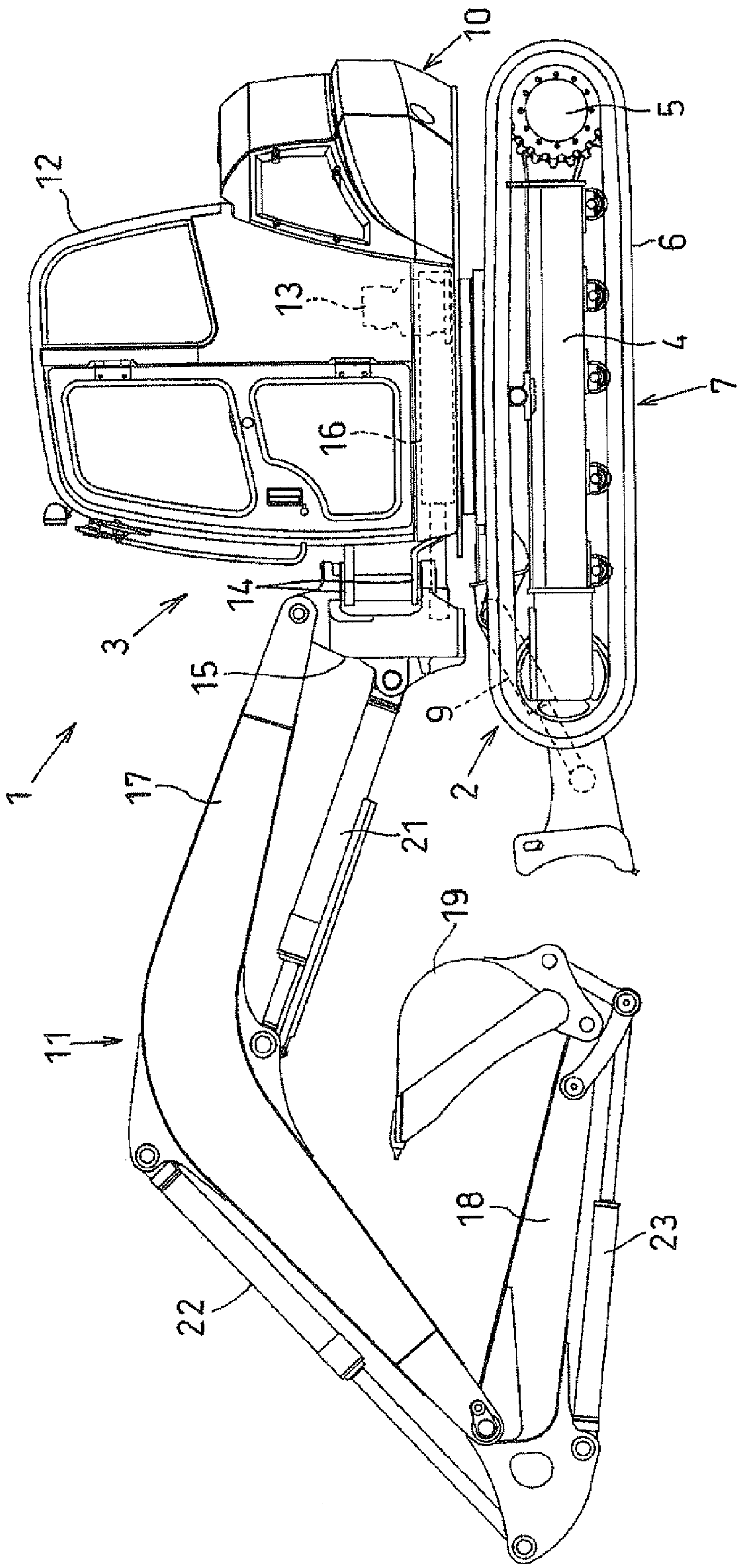
FIG. 1 is a side view showing the entire backhoe.
Figure 2:
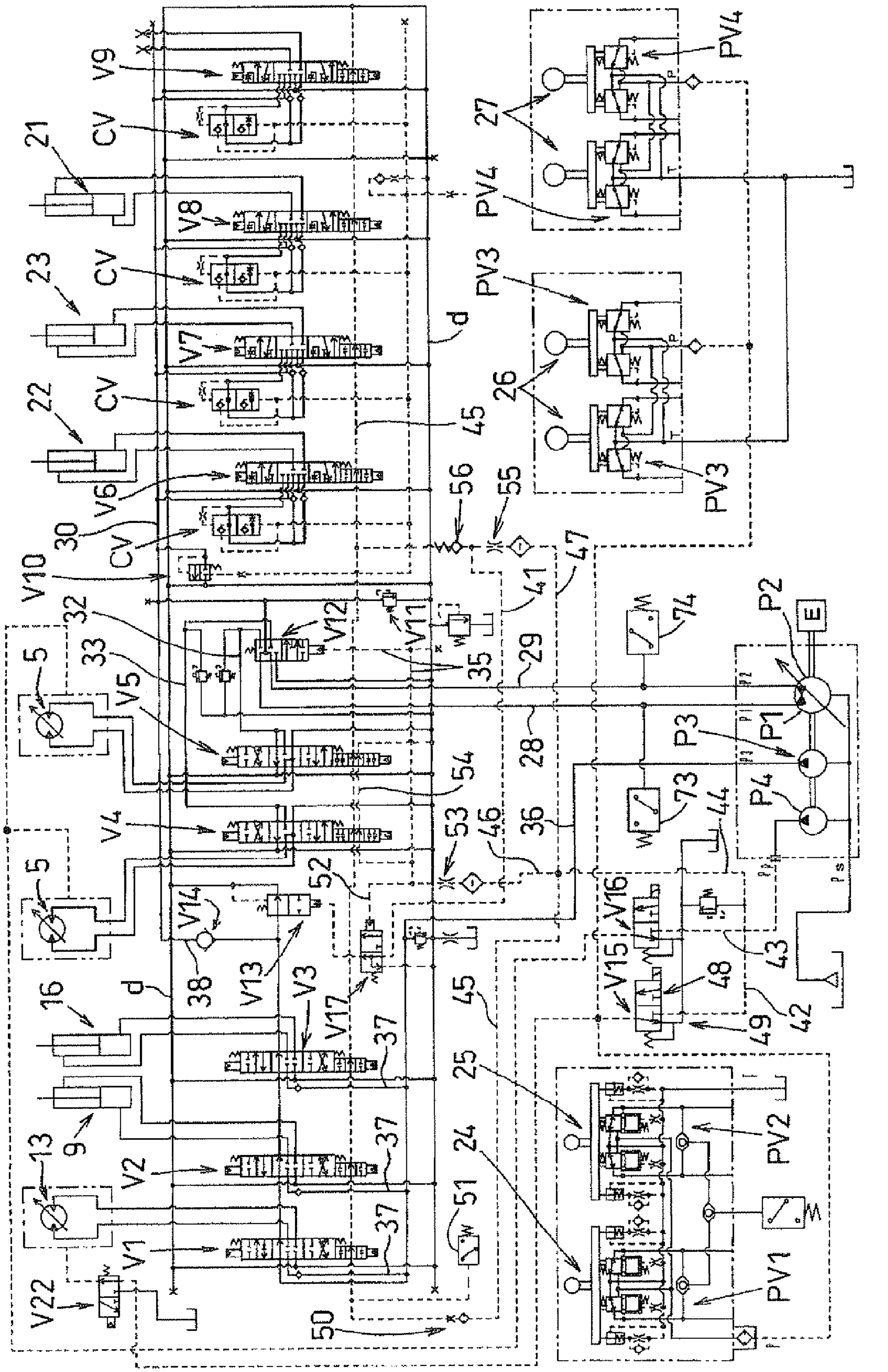
FIG. 2 is a diagram showing the entire hydraulic circuit.
Figure 3:
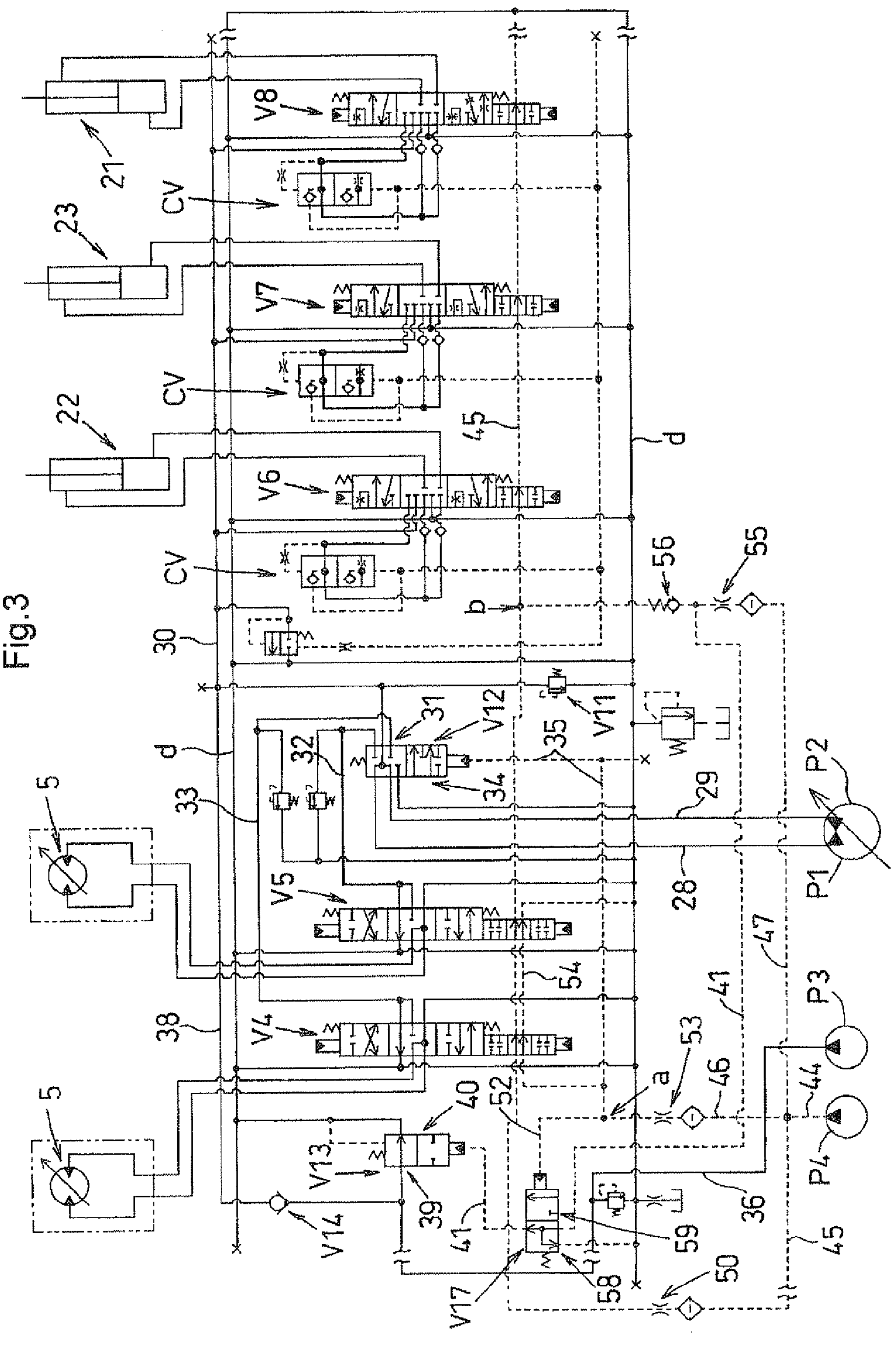
FIG. 3 is a hydraulic circuit diagram showing the operating system of the first flow channel switching valve and the second flow channel switching valve.
Figure 4:
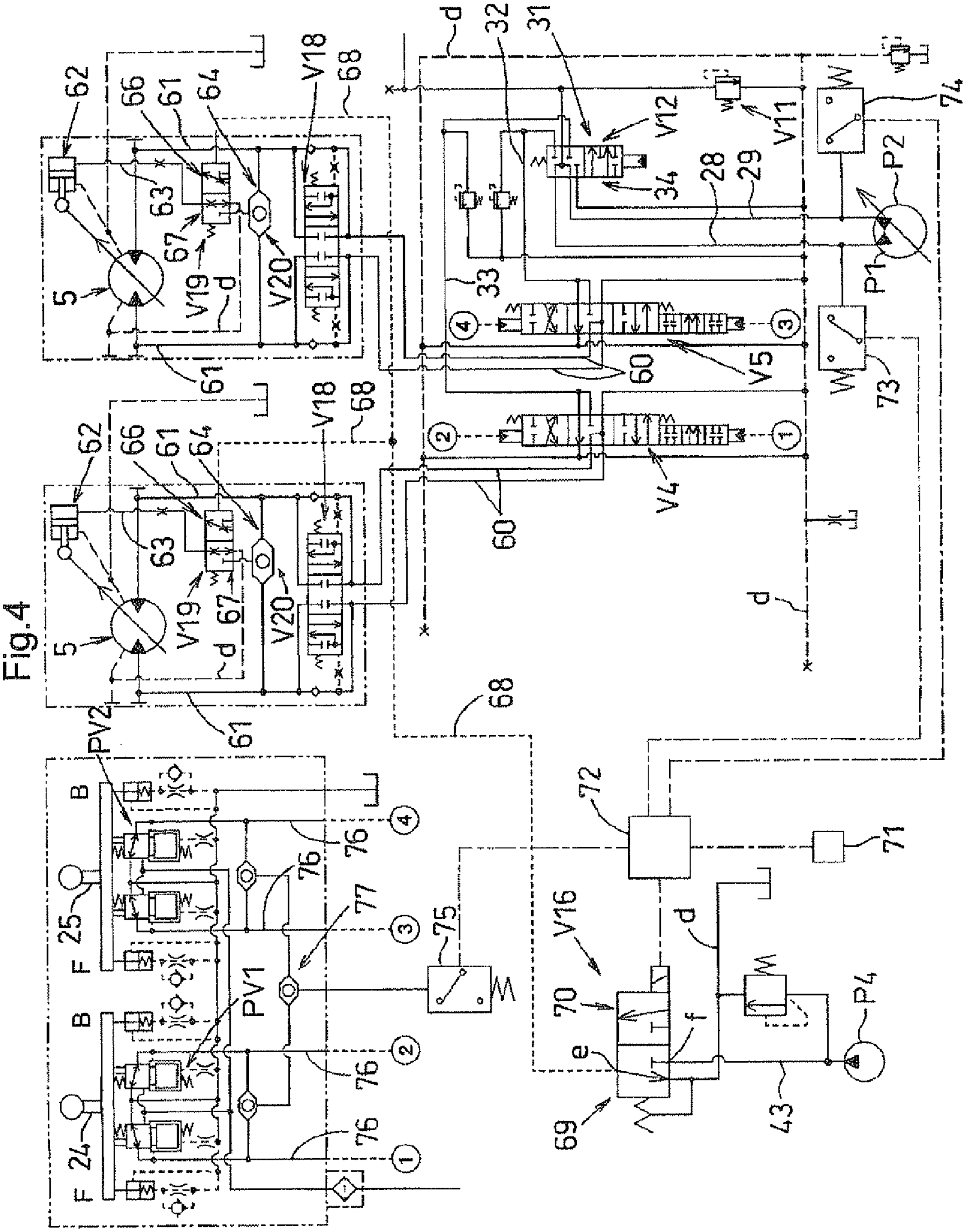
FIG. 4 is a hydraulic circuit diagram showing the automatic travel deceleration system.
Figure 5:
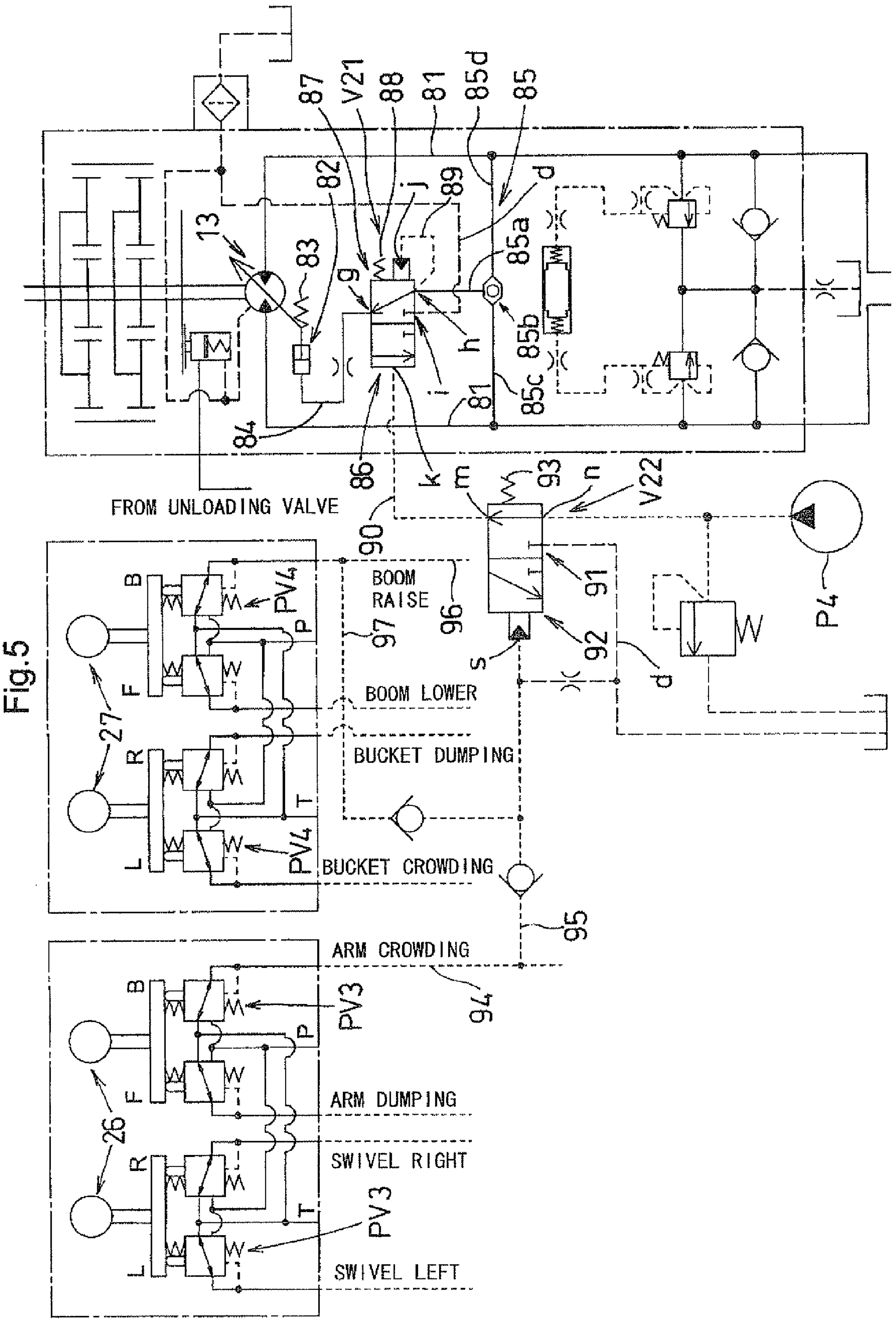
FIG. 5 is a hydraulic circuit diagram showing the automatic swivel deceleration system.

31 operating position
34 travel position
39 non-feeding position
40 feeding position
41 flow channel switching circuit
54 travel detection circuit
58 non-operating position
59 operating position
P1 first pump
P2 second pump P3 third pump
V1 swivel control valve
V4 left-side travel control valve
V5 right-side travel control valve
V6 arm control valve
V7 bucket control valve
V8 boom control valve
V12 first flow channel switching valve
V13 second flow channel switching valve
V17 flow channel switching operation valve

What is claimed is:

1. A backhoe hydraulic system comprising:

travel pumps (P1, P2) for feeding pressure oil to control valves (V4, V5) for a travel device;

a swivel pump (P3) for feeding pressure oil to a control valve (V1) for a swivel base;

a first flow channel switching valve (V12) that is capable of switching between a work position (31) in which the pressure oil from said travel pumps is fed to control valves (V6, V7, V8) for a ground working device during non-travel, and a travel position (34) in which the pressure oil from said travel pumps is fed to control valves (V4, V5) for a left-right travel device during travel;

a second flow channel switching valve (V13) that is capable of switching between a non-feed position (39) in which the pressure oil from said swivel pump (P3) is not supplied to the control valves (V6, V7, V8) for said ground working device, and a feeding position (40) in which the pressure oil from said swivel pump (P3) is fed to the control valves (V6, V7, V8) for the ground working device;

a travel detection circuit (54) for feeding a pilot pressure to the first flow channel switching valve (V12) to switch the first flow channel switching valve (V12) to said travel position (34) when the control valves (V4, V5) for said travel device are operated; and a flow channel switching circuit (41) that is capable of feeding a pilot pressure to the second flow channel switching valve (V13) so as to switch the second flow channel switching valve (V13) to the feeding position (40) when the control valves (V4, V5) for said travel device are operated during operation of the control valves (V6, V7, V8) for said ground working device;

wherein a flow channel switching operation valve (V17) is provided to said flow channel switching circuit (41), and the flow channel switching operation valve (V17) is configured so as to be capable of switching between a non-operating position (58) in which the pilot pressure is not fed to said second flow channel switching valve (V13), and an operating position (59) in which the pilot pressure is fed to said second flow channel switching valve (V13), and so as to be switched to the operating position (59) by the pilot pressure from said travel detection circuit (54); and wherein said second flow channel switching valve (V13) switches from the non-feeding position (39) to the feeding position (40) at the same time as said first flow channel switching valve (V12) or before said first flow channel switching valve (V12) when the control valves (V4, V5) for said travel device are operated during operation of the control valves (V6, V7, V8) for said ground working device, and said first flow channel switching valve (V12) is switched from the work position (31) to the travel position (34).

2. The backhoe hydraulic system according to claim 1, wherein said travel pumps have two pumps that include a first pump (P1) and a second pump (P2); and said first flow channel switching valve (V12) is configured so as to feed the pressure oil from said first pump (P1) in said work position (31) together with the pressure oil from said second pump (P2) to the control valves (V6, V7, V8) for said ground working device, and to feed the pressure oil from said first pump (P1) in said travel position (34) and the pressure oil from said second pump (P2) independently to the control valves (V4, V5) for the left-right travel device.

3. A backhoe hydraulic system comprising:

a travel detection circuit (54) for feeding a pilot pressure to a first flow channel switching valve (V12) to switch the first flow channel switching valve (V12) to a travel position (34) in which pressure oil is fed to the control valves (V4, V5) for a travel device when the control valves (V4, V5) for the travel device are operated; and a flow channel switching circuit (41) that is capable of feeding a pilot pressure to a second flow channel switching valve (V13) so as to switch said second flow channel switching valve (V13) to a feeding position (40) in which pressure oil is fed to control valves (V6, V7, V8) for a ground working device when the control valves (V4, V5) for said travel device are operated during operation of the control valves (V6, V7, V8) for said ground working device;

wherein a flow channel switching operation valve (V17) is provided to said flow channel switching circuit (41), and the flow channel switching operation valve (V17) is configured so as to be capable of switching between a non-operating position (58) in which the pilot pressure is not fed to said second flow channel switching valve (V13), and an operating position (59) in which the pilot pressure is fed to said second flow channel switching valve (V13), and so as to be switched to the operating position (59) by the pilot pressure from said travel detection circuit (54).

* * * * *